United States Patent
Ohta

(10) Patent No.: US 11,790,511 B2
(45) Date of Patent: Oct. 17, 2023

(54) INFORMATION PROCESSING DEVICE, SYSTEM, AND METHOD

(71) Applicant: NEC Corporation, Tokyo (JP)

(72) Inventor: Masahiko Ohta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 346 days.

(21) Appl. No.: 17/262,585

(22) PCT Filed: Apr. 9, 2019

(86) PCT No.: PCT/JP2019/015416
§ 371 (c)(1),
(2) Date: Jan. 22, 2021

(87) PCT Pub. No.: WO2020/021778
PCT Pub. Date: Jan. 30, 2020

(65) Prior Publication Data
US 2021/0350520 A1    Nov. 11, 2021

(30) Foreign Application Priority Data

Jul. 27, 2018  (JP) ................................. 2018-141234

(51) Int. Cl.
*G06T 7/254* (2017.01)
*G01M 99/00* (2011.01)
*G06T 7/00* (2017.01)

(52) U.S. Cl.
CPC .......... *G06T 7/0004* (2013.01); *G01M 99/00* (2013.01); *G06T 7/254* (2017.01); *G06T 2207/30108* (2013.01)

(58) Field of Classification Search
CPC .................. G06T 7/0004; G06T 7/254; G06T 2207/30108; G06T 2207/10016;
(Continued)

(56) References Cited

U.S. PATENT DOCUMENTS

2010/0183191 A1* 7/2010 Wieneke ................ G01B 11/16
                                                              382/100
2016/0011151 A1* 1/2016 Campbell Leckey ......................
                                                              G01N 29/043
                                                              73/601
(Continued)

FOREIGN PATENT DOCUMENTS

CN        1687728 A       10/2005
CN      101782372 A        7/2010
(Continued)

OTHER PUBLICATIONS

Choi et al., "development of elastic damage load theorem for damage detection in a statically determinate beam" computers and structure 82, 2004, pp. 2483-2492 (year 2004).*

(Continued)

*Primary Examiner* — Sheela C Chawan
(74) *Attorney, Agent, or Firm* — Sughrue Mion, PLLC

(57) ABSTRACT

An information processing device includes a displacement calculation means and a motion estimation means. The displacement calculation means acquires time-series images obtained by capturing images of a measurement target region of a structure supported by a supporting member. The displacement calculation means calculates a three-dimensional displacement of the measurement target region from the acquired time-series images. The motion estimation means estimates a motion of the supporting member in the structure based on the three-dimensional displacement of the measurement target region.

13 Claims, 10 Drawing Sheets

(58) Field of Classification Search
CPC ...... G06T 7/0002; G06T 7/248; G01M 99/00; G01M 5/0008; G01M 5/0058; G01M 5/0091; G01B 11/026; E01D 22/00
USPC .................................................. 382/141, 100
See application file for complete search history.

(56) References Cited

U.S. PATENT DOCUMENTS

| | | | |
|---|---|---|---|
| 2016/0171309 | A1 | 6/2016 | Hay |
| 2018/0052117 | A1 | 2/2018 | Imai |
| 2019/0178814 | A1 | 6/2019 | Nakano et al. |
| 2020/0175352 | A1* | 6/2020 | Cha .......................... G06N 3/04 |

FOREIGN PATENT DOCUMENTS

| | | | |
|---|---|---|---|
| CN | 102449333 A | 5/2012 | |
| CN | 104990935 A | 10/2015 | |
| CN | 107538380 A | 1/2018 | |
| CN | 207502197 U | 6/2018 | |
| JP | 2893018 B1 | 5/1999 | |
| JP | H11-303020 A | 11/1999 | |
| JP | 2003-214829 A | 7/2003 | |
| JP | 2012-107679 A | 6/2012 | |
| JP | 2017-167098 A | 9/2017 | |
| KR | 10-2008-0021300 A | 3/2008 | |
| WO | 2016/152075 A1 | 9/2016 | |
| WO | 2017/167260 A1 | 10/2017 | |
| WO | 2017/221965 A1 | 12/2017 | |
| WO | WO-2017029905 A * | 5/2018 | ............. G01B 11/16 |

OTHER PUBLICATIONS

Chinese Office Action for CN Application No. 201980049947.2 dated Jul. 1, 2022 with English Translation.
International Search Report for PCT Application No. PCT/JP2019/015416, dated Jul. 9, 2019.
Chinese Office Action for CN Application No. 201980049947.2 dated Jan. 10, 2022 with English Translation.
Japanese Office Communication for JP Application No. 2020-532154 dated Feb. 22, 2022 with English Translation.

* cited by examiner

INFORMATION PROCESSING DEVICE, SYSTEM, AND METHOD

This application is a National Stage Entry of PCT/JP2019/015416 filed on Apr. 9, 2019, which claims priority from Japanese Patent Application 2018-141234 filed on Jul. 27, 2018, the contents of all of which are incorporated herein by reference, in their entirety.

TECHNICAL FIELD

The present disclosure relates to an information processing device, a system, a method, and a computer-readable medium and, more particularly, relates to an information processing device, a system, a method, and a computer-readable medium that can be used to grasp the condition of a target by using captured images.

BACKGROUND ART

In a bridge, a girder end member configured as a bearing, a joint (expansion joint), a fixed end or the like is a place where damage is likely to concentrate, and therefore appropriate operation and maintenance are needed. According to an inspection manual, it is necessary to conduct a visual inspection and determine whether the functions of a bearing, a joint and the like are maintained or not.

When conducting a visual inspection, a worker needs to come close to a girder end, and an aerial work vehicle or a bridge inspection vehicle is required in some cases for the worker to come close to the girder end. Thus, for the operation and maintenance of a girder end, there are problems to be addressed in terms of cost, such as vehicle and operator arrangement cost, paperwork for lane closure, lane closure cost, and loss of revenue opportunity. There are also problems to be addressed in terms of safety, such as the safety of a worker, for the operation and maintenance of a girder end.

Patent Literature 1 discloses a method of determining the soundness of a bearing by using a contact sensor. In Patent Literature 1, contact sensors are placed at a plurality of predetermined positions of a bearing, and the amounts of movement measured by the contact sensors are collected. To be specific, the amount of movement in the bridge axis direction of an upper plate in a roller bearing, the amount of movement in the bridge axis direction of a roller axis, the amount of movement in the bridge axis direction of a lower plate, and the variation distance between upper and lower plates are collected by using four strain gauges. In Patent Literature 1, the soundness of a bearing is determined by calculating differences between those measured amounts of movement and the proportion of each difference.

Patent Literature 2 discloses a condition determination device for a structure. In the condition determination device disclosed in Patent Literature 2, a displacement calculation unit calculates the two-dimensional space distribution of displacements of time-series images from the time-series images before and after load application on a structure surface. A correction amount calculation unit calculates the amount of correction based on the amount of movement in the normal direction on the structure surface caused by load application from the two-dimensional space distribution of displacements of time-series images. A displacement correction unit subtracts the amount of correction from the two-dimensional space distribution of time-series images and thereby extracts the two-dimensional space distribution of displacements on the structure surface. An anomaly determination unit identifies a defect of the structure based on comparison between the two-dimensional space distribution of displacements on the structure surface and the spatial distribution of displacements given in advance.

CITATION LIST

Patent Literature

PTL1: Japanese Patent No. 2893018
PTL2: International Patent Publication No. WO2016/152075

SUMMARY OF INVENTION

Technical Problem

Patent Literature 1 allows determining the soundness of a bearing without a visual inspection. However, since the contact sensors are mounted on the bearing in Patent Literature 1, it is necessary to come close to the bearing at least once. Therefore, an aerial work vehicle or the like is needed in some cases in Patent Literature 1, and there remain problems in terms of cost and safety.

Patent Literature 2 uses time-series images captured by an imaging device, and there is no need to use an aerial work vehicle or the like. However, although defects such as a cavity occurring inside a structure and a crack occurring on a surface can be identified in Patent Literature 2, it is difficult to directly capture images of a supporting member such as a bearing that supports a structure, and it is unable to determine the soundness of the supporting member.

An object of the present disclosure is to provide an information processing device, a system, a method, and a computer-readable medium capable of providing information that helps determining the soundness of a supporting member supporting a structure at low cost.

Solution to Problem

To solve the above problem, the present disclosure provides an information processing device including a displacement calculation means for calculating a three-dimensional displacement of a measurement target region of a structure supported by a supporting member from time-series images obtained by capturing images of the measurement target region, and a motion estimation means for estimating a motion of the supporting member in the structure based on the three-dimensional displacement of the measurement target region.

Further, the present disclosure provides an information processing system including an information processing device configured to calculate a three-dimensional displacement of a measurement target region of a structure supported by a supporting member from time-series images obtained by capturing images of the measurement target region, and estimate a motion of the supporting member in the structure based on the calculated three-dimensional displacement of the measurement target region, an information storing device configured to acquire the estimated motion of the structure from the information processing device and store the motion, and an information display device configured to acquire the estimated motion of the structure from the information storing device and display the motion.

The present disclosure provides an information processing method including calculating a three-dimensional displacement of a measurement target region of a structure supported by a supporting member from time-series images obtained by capturing images of the measurement target region, and estimating a motion of the supporting member in the structure based on the three-dimensional displacement of the measurement target region.

The present disclosure provides a computer-readable medium storing a program causing a computer to execute a process of calculating a three-dimensional displacement of a measurement target region of a structure supported by a supporting member from time-series images obtained by capturing images of the measurement target region, and estimating a motion of the supporting member in the structure based on the three-dimensional displacement of the measurement target region.

Advantageous Effects of Invention

An information processing device, a system, a method, and a computer-readable medium according to the present disclosure is capable of providing information that helps determining the soundness of a supporting member supporting a structure at low cost.

DESCRIPTION OF EMBODIMENTS

Figure 1:
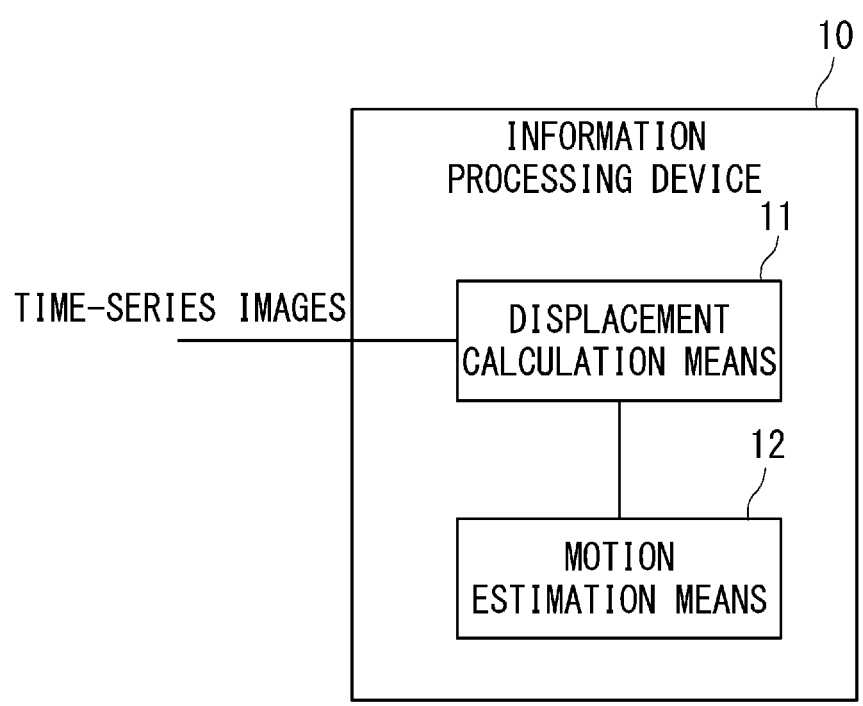
FIG. 1 is a block diagram schematically showing an information processing device according to the present disclosure.

Prior to describing example embodiments of the present disclosure, the overview of the present disclosure will be described. FIG. 1 schematically shows an information processing device according to the present disclosure. An information processing device 10 includes a displacement calculation means 11 and a motion estimation means 12.

Time-series images, which have been obtained by capturing images of a measurement target region of a structure supported by a supporting member, are input to the displacement calculation means 11. The displacement calculation means 11 calculates a three-dimensional displacement of the measurement target region from the time-series images. The motion estimation means 12 estimates the motion of the supporting member in the structure based on the three-dimensional displacement of the measurement target region calculated by the displacement calculation means 11.

In the present disclosure, the motion of the supporting member in the structure is estimated based on the three-dimensional displacement calculated from the time-series images. The estimated motion of the supporting member can be provided as information that helps determining the soundness of the supporting member supporting the structure. In the present disclosure, the motion of the supporting member of the structure is estimated using time-series images, and there is no need to mount a contact sensor on the supporting member, differently from Patent Literature 1. Therefore, the information processing device according to the present disclosure is capable of providing information that helps determining the soundness of a part supporting the structure at low cost.

Figure 2:
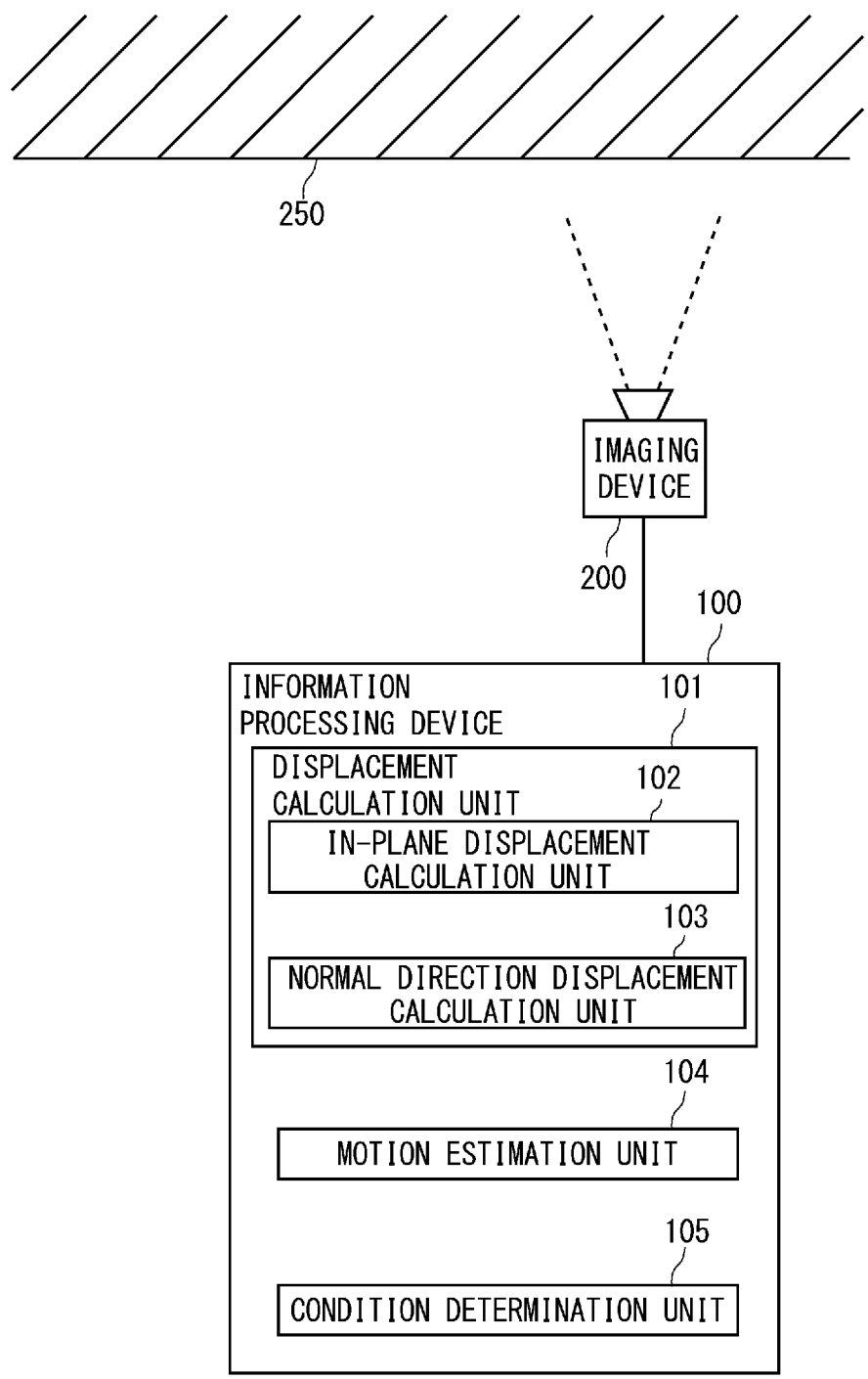
FIG. 2 is a block diagram showing an information processing device according to a first example embodiment of the present disclosure.

Example embodiments of the present disclosure are described hereinafter with reference to the drawings. FIG. 2 shows an information processing device according to a first example embodiment of the present disclosure. An information processing device 100 includes a displacement calculation unit 101, a motion estimation unit 104, and a condition determination unit 105. The information processing device 100 is connected to an imaging device 200. The information processing device 100 acquires time-series images obtained by capturing images of a measurement target region of a structure 250 from the imaging device 200. In this example embodiment, the structure 250 is an infrastructure structure such as a beam structure typified by a bridge, a road, a building or a facility, for example.

Figure 3:
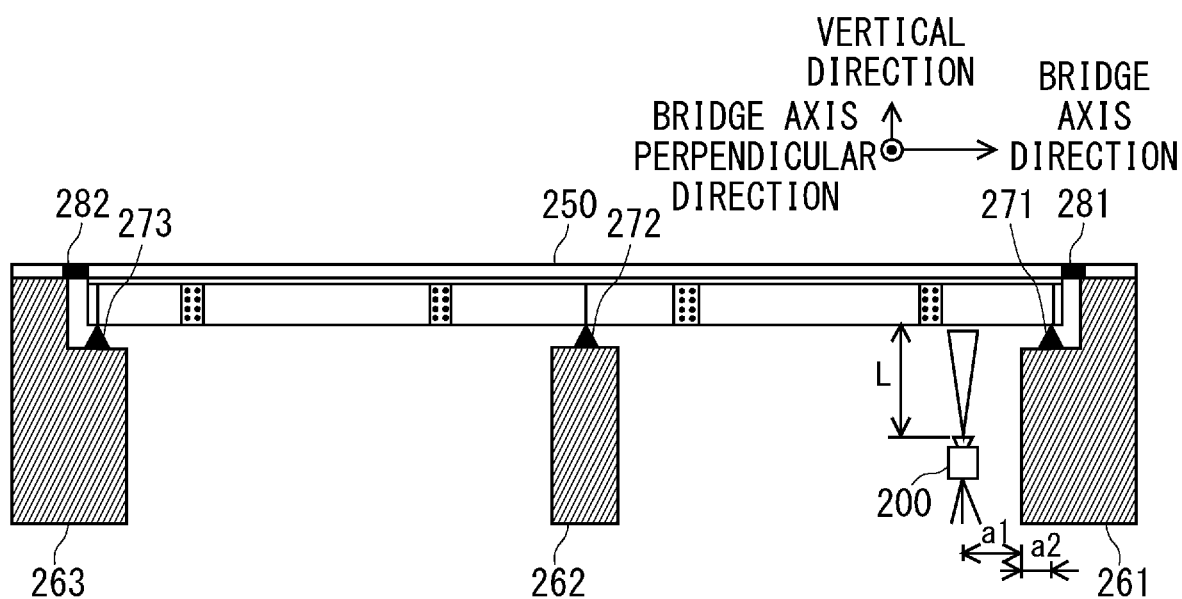
FIG. 3 is a view showing the positional relationship between a structure and an imaging device.

FIG. 3 shows the positional relationship between the structure 250 and the imaging device 200. The structure 250 includes a main girder of a bridge, for example. The structure (bridge) 250 is supported by substructures (abutment or pier) 261 to 263 through supporting members 271 to 273. Further, the upper surface side of the bridge 250 is connected to the substructures (abutments) 261 and 263 at both ends through joints (expansion joints) 281 and 282. The supporting members 271 to 273 are bearings such as a line bearing, a bearing plate, a pin bearing, a pivot bearing or a rubber bearing, for example. At least one of the supporting members 271 to 273 may be fixed to the substructure of the bridge.

In this example embodiment, the imaging device 200 is placed under the bridge 250 and captures images of a specified region (measurement target region) of a lower surface such as a bridge girder or a slab. The imaging device 200 is placed at a distance a1 from the end of the abutment 261, for example. The distance a1 is measured after the installation of the imaging device 200, for example. Alternatively, the imaging device 200 may be placed at a predetermined distance a1 from the end of the abutment 261 by using a jig. When the distance from the end of the abutment 261 to the center position of the supporting member (bearing) 271 is a2, the distance from the imaging device 200 to the center of the bearing 271 in the bridge axis direction is a1+a2. The distance a2 is calculated from a design drawing or the like, for example. Alternatively, the distance a2 may be set according to the width of an abutment or pier on which the bearing 271 is placed. For example, in the case of a continuous girder, the distance a2 may be set to ½ the width of the pier or the like. In the case of a girder end, the distance a2 may be set to ⅓ the width of the pier or the like.

Further, it is assumed that the distance from the principal point of a lens of the imaging device 200 to the measurement target region is a distance L. When some sort of external force is applied to the bridge 250 or when a vehicle is passing on the bridge 250, flexure or the like occurs in the bridge 250. It is also assumed that the bridge 250 exists within the range of the depth of field, and an image of the bridge 250 is formed on an image sensor of the imaging device 200 even when the bridge 250 is displaced in the vertical direction.

The imaging device 200 is installed on the ground by using a fixing jig such as a tripod, for example. Alternatively, the imaging device 200 may be installed on the abutment 261 by using a fixing jig. A method of installing the imaging device 200, a direction of imaging and the like are not particularly limited as long as the distance from the imaging device 200 to the ground or pier and the angle from the ground or pier are known.

Hereinafter, it is assumed that the imaging device 200 is placed in such a way that the direction of imaging is parallel to the vertical direction, and the light-receiving surface is parallel to the measurement target region. In this case, the normal to the light-receiving surface of the image sensor included in the imaging device 200 is parallel to the normal to the measurement target region, and the two-dimensional directions in the captured time-series images (the horizontal direction of the time-series images and the perpendicular direction of the time-series images) are parallel to the plane direction of the measurement target region. The plane direction of the measurement target region means the direction parallel to the plane that constitutes the measurement target region on the bridge 250. In the following description, the horizontal direction of the time-series images is referred to as a X-direction, the perpendicular direction of the time-series images is referred to as a Y-direction, and the normal direction (vertical direction) of the measurement target region is referred to as a Z-direction. The X-direction is parallel to the bridge axis direction, the Y-direction is parallel to the direction perpendicular to the bridge axis direction (bridge axis perpendicular direction), and the Z-direction is parallel to the vertical direction.

Note that, in this example embodiment, the structure 250 is not limited to an infrastructure structure as long as it involves a motion in the three-dimensional direction. Further, although an example in which the measurement target region whose images are to be captured by the imaging device 200 is a region perpendicular to the vertical direction is shown in FIGS. 2 and 3, it is not limited thereto. The imaging device 200 may capture images of a region parallel to the vertical direction, such as a bridge railing, for example.

The displacement calculation unit 101 acquires time-series images from the imaging device 200, and calculates the three-dimensional displacement of the measurement target region of the bridge 250 based on the acquired time-series images. The displacement calculation unit 101 calculates a displacement in the normal direction (Z-direction) of the bridge 250 and displacements in two directions (X-direction and Y-direction) orthogonal to each other in the plane perpendicular to the normal direction. The displacement calculation unit 101 is equivalent of the displacement calculation means 11 in FIG. 1.

The displacement calculation unit 101 includes an in-plane displacement calculation unit 102 and a normal direction displacement calculation unit 103. The in-plane displacement calculation unit 102 calculates a displacement in the X-direction and a displacement in the Y-direction of the measurement target region. The normal direction displacement calculation unit 103 calculates a displacement in the Z-direction of the measurement target region.

In this example embodiment, the in-plane displacement calculation unit 102 uses, among the acquired time-series images, an image at any given time as a reference image and uses remaining images as processing images. The reference image is preferably an image at a time when an external force is not applied to the bridge 250, and flexure is not occurring in the main girder or the like, for example. The in-plane displacement calculation unit 102 sets a region of interest, which is a certain region (which is also referred to hereinafter as a specific region) included in the measurement target region, in the reference image. The specific region includes patterns, irregularities on the surface and the like, for example. The number of specific regions may be one or more than one. For each processing image, the in-plane displacement calculation unit 102 searches for a region corresponding to the specific region of the reference image. The in-plane displacement calculation unit 102 calculates, for each processing image, a difference between the coordinates of the specific region in the reference image and the coordinates of the specific region in the processing image as a displacement ($d1x$, $d1y$) in the in-plane direction.

To be more specific, the in-plane displacement calculation unit 102 first compares processing images with the reference image and performs region-based matching, and identifies, for each processing image, the position of a region with the highest degree of matching with the specific region in the reference image. The in-plane displacement calculation unit 102 calculates a difference between the identified position and the position of the specific region in the reference image as a displacement $d1x$ in the X-direction and a displacement $d1y$ in the Y-direction. The in-plane displacement calculation unit 102 searches for the coordinates of a region with the highest correlation with the specific region by using a similarity correlation function such as SAD (Sum of Absolute Difference), SSD (Sum of Squared Difference), NCC (Normalized Cross-Correlation) or ZNCC (Zero-means Normalized Cross-Correlation), for example.

When there are a plurality of specific regions, a specific region with the highest degree of matching with the corresponding region in the processing image among the plurality of specific regions may be selected, and a difference between the position of the selected specific region and the position of the corresponding region in the processing image may be calculated as a displacement ($d1x$, $d1y$) in the in-plane direction.

The in-plane displacement calculation unit 102 may search for the position of a region with the highest degree of matching with the specific region by using fitting. To be specific, the in-plane displacement calculation unit 102 makes a search for the location (coordinates) of a region with the highest degree of matching with the specific region in each processing image, then calculates the similarity in the positions (coordinates) on the front, back, left and right of this location (coordinates) and thereby calculates a similarity correlation function. The in-plane displacement calculation unit 102 applies a method such as line fitting, curve fitting or parabola fitting to the calculated similarity correlation function and searches for the position of a region with the highest degree of matching with the specific region among the coordinates. In this way, the position (coordinates) of a region in the processing image that is similar to the specific region is calculated at sub-pixel accuracy.

The normal direction displacement calculation unit 103 creates a group of images (which is also referred to hereinafter as a reference image group) by scaling up or down the reference image at a plurality of scaling factors in order to calculate a displacement $d1z$ in the normal direction of the specific region. At this time, the normal direction displacement calculation unit 103 creates the reference image group by scaling up or down the reference image with respect to the center position, which is the position deviated from the center of the reference image by the displacement (d1$x$, d1$y$) in the in-plane direction calculated by the in-plane displacement calculation unit 102.

The normal direction displacement calculation unit 103 checks each processing image against scaled-up images and scaled-down images, and identifies, for each processing image, a scaled-up image or a scaled-down image with the highest degree of matching. The normal direction displacement calculation unit 103 identifies a scaled-up image or a scaled-down image with a high degree of matching by using the above-described similarity correlation function such as SAD, SSD, NCC or ZNCC, for example. The normal direction displacement calculation unit 103 identifies an image with the highest degree of similarity, i.e., with the highest correlation, from images in the reference image group, and uses an enlargement factor or a reduction factor (which is also referred to hereinafter as a scaling factor) of the identified image as the amount (d1$z$) indicating a displacement in the normal direction of the specific region.

After identifying the image with the highest degree of matching, the normal direction displacement calculation unit 103 may select images with scaling factors immediately larger and smaller than the identified image from the reference image group, and calculate the similarity correlation function between the specified image and the selected image. The normal direction displacement calculation unit 103 may apply a method such as line fitting or curve fitting by using the calculated similarity correlation function and calculate a scaling factor, which is the amount (d1$z$) indicating a displacement in the normal direction. This enables calculating the scaling factor (d1$z$) indicating a displacement in the normal direction with higher accuracy.

Note that the in-plane displacement calculation unit 102 and the normal direction displacement calculation unit 103 may perform the above-described processing a plurality of times in order to increase the accuracy of the calculated displacement. To be specific, in consideration of the impact of the scaling factor d1$z$ calculated by the normal direction displacement calculation unit 103, the in-plane displacement calculation unit 102 may select an image corresponding to the scaling factor d1$z$ from images in the reference image group and use the selected image as a new reference image. In the case of performing the above-described fitting, the in-plane displacement calculation unit 102 may scale up or down the reference image with a scaling factor obtained by applying the fitting and generate a new reference image. The in-plane displacement calculation unit 102 may compare a processing image with the new reference image, identify a similar part that is the most similar to the new reference image, and detect a displacement (d2$x$, d2$y$) of the similar part.

Further, the normal direction displacement calculation unit 103 may set the center position of the scale-up or scale-down of each image in the reference image group based on the displacement (d2$x$, d2$y$) that is newly detected by the in-plane displacement calculation unit 102, and create a new reference image group. The normal direction displacement calculation unit 103 may calculate the degree of similarity between the processing image and each image in the new reference image group and identify an image with the highest degree of similarity among the images in the new reference image group. The normal direction displacement calculation unit 103 may use the scaling factor of the specified image as the amount (d2$z$) indicating a displacement in the normal direction of the specific region.

In the first-time processing, the in-plane displacement calculation unit 102 calculates the displacement (d1$x$, d1$y$) with no consideration given to the scaling factor d1$z$ indicating a displacement in the normal direction. On the other hand, in the second-time processing, the in-plane displacement calculation unit 102 calculates the displacement (d2$x$, d2$y$) with consideration given to the scaling factor d1$z$. In this case, the in-plane displacement calculation unit 102 is capable of calculating the displacement (d2$x$, d2$y$) in the in-plane direction more accurately in the second-time processing than in the first-time processing.

Note that the above-described number of repetitions is not particularly limited to two. If the above-described processing is repeated a plurality of times, the accuracy of a displacement is improved. The number of repetitions may be a preset number or may be set as appropriate according to a result. Further, the in-plane displacement calculation unit 102 may calculate a difference between the value of a displacement calculated last time and the value of a displacement calculated this time, and repeat the above-described processing until this difference falls below a predetermined threshold.

In the following description, the in-plane displacement finally calculated by the in-plane displacement calculation unit 102 in repetitive processing is indicated by dnx and dny. Further, the scaling factor indicating the amount of a displacement in the normal direction finally calculated by the normal direction displacement calculation unit 103 is indicated by dnz. The in-plane displacement calculation unit 102 calculates the in-plane displacement dnx and dny for the processing image at each time t. Further, the normal direction displacement calculation unit 103 calculates the scaling factor dnz for the processing image at each time t. In the following description, the in-plane displacement at time t is indicated by dnx(t) and dny(t), and the scaling factor at time t is indicated by dnz(t).

The in-plane displacement calculation unit 102 converts the calculated in-plane displacement dnx(t) and dny(t) into a displacement (the amount of movement) Δx(t) in the X-direction and a displacement (the amount of movement) Δy(t) in the Y-direction of the bridge 250 by using shooting information. The shooting information contains information about a shooting distance, a shooting angle, and a size per pixel on a subject. Further, the normal direction displacement calculation unit 103 converts the calculated scaling factor dnz(t) into a displacement (the amount of movement) Δz(t) in the Z-direction of the bridge 250 by using the shooting distance contained in the shooting information.

To be specific, the displacements dnx(t) and dny(t) in the plane direction of the specific region are calculated in units of pixels. When the lengths of an image sensor of the imaging device 200 per pixel in the X-direction and the Y-direction are Dx and Dy [mm/pixel], respectively, the amounts of movement Δx(t) and Δy(t) [mm] respectively in the X-direction and the Y-direction are represented by the following equations 1 and 2.

$$\Delta x(t) = Dx \cdot dnx(t) \tag{1}$$

$$\Delta y(t) = Dy \cdot dny(t) \tag{2}$$

The lengths Dx and Dy [mm/pixel] of the image sensor of the imaging device 200 per pixel are calculated by the following equations 3 and 4, where the pixel pitch of the image sensor is px and py [mm], the focal length of the lens is f [mm], and the distance from the principal point of the lens to the measurement target region is L [mm].

$$Dx = px \cdot (L/f) \quad (3)$$

$$Dy = py \cdot (L/f) \quad (4)$$

The lengths Dx and Dy of the image sensor per pixel may be calculated based on the number of pixels of the image sensor and the angle of view of the imaging device 200. To be specific, the lengths Dx and Dy of the image sensor per pixel can be calculated by the following equations 5 and 6 where the number of pixels of the image sensor is pnx and pny, and the angle of view of the imaging device 200 is FOVx and FOVy.

$$Dx = L/pnx \times \tan^{-1}(FOVx/2) \quad (5)$$

$$Dy = L/pny \times \tan^{-1}(FOVy/2) \quad (6)$$

Further, a displacement in the normal direction of the specific region is calculated as a scaling factor. The amount of movement z(t) [mm] in the Z-direction can be represented by the following equation 7 by using the distance L [mm] from the principal point of the lens to the specific region.

$$\Delta z(t) = L \cdot dnz(t) \quad (7)$$

The three-dimensional movement (three-dimensional displacement) Δx(t), Δy(t) and Δz(t) of the measurement target region obtained above can be obtained for each frame obtained by capturing time-series images. Thus, each amount of movement obtained for each time-series image represents the oscillation component of the measurement target region where the inverse of a shooting frame rate is a sampling interval. Thus, each amount of movement obtained for each time-series image can be treated as oscillation information (oscillation waveform) of the measurement target region in each of the X-direction, the Y-direction and the Z-direction.

Note that, although each displacement is calculated above based on the assumption that the Z-direction is parallel to the vertical direction, there is a case where the Z-direction is not parallel to the vertical direction. Specifically, there is a case where the normal to the light-receiving surface of the image sensor is not parallel to the normal to the measurement target region, and it is at a shooting angle. In such a case, the motion of the support structure may be estimated by correcting an angle corresponding to the shooting angle by using a trigonometric function operation, and calculating displacements in the vertical direction and two directions perpendicular to the vertical direction. Because of the characteristics of a trigonometric function operation, if the shooting angle is small, the amount of movement in the Z-direction before correction and the amount of movement in the Z-direction after correction can be regarded as being approximately the same.

A displacement of a superstructure (bridge 250) due to live load caused by passing of a vehicle is different in the way of moving because a function to be charged is different depending on the type of the supporting member (bearing) 271 serving as a point of support. The present inventor compared the displacement measured by a contact sensor when the contact sensor is mounted on the bearing 271 and the displacement of the measurement target region of the bridge 250 calculated by the displacement calculation unit 101 in a bridge in which the bearing 271 is a rubber bearing and a bridge in which the bearing 271 is a bearing plate (movable). As a result, it was found that, by capturing images around the end part of the bridge 250 supported by the bearing 271 with use of the imaging device 200 and observing the amount of movement of the bridge 250 in the three-axial directions, the displacement (motion component) of the bearing 271 can be measured in the same manner as when using a contact sensor.

Figure 4:
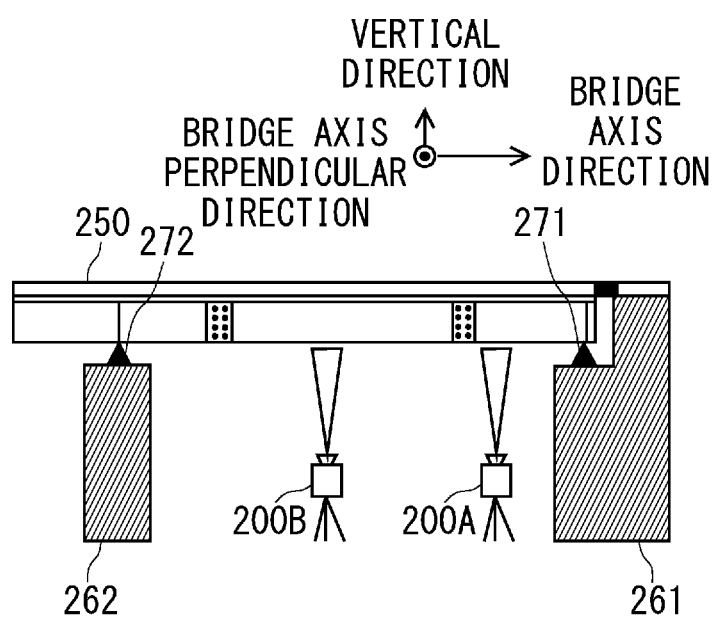
FIG. 4 is a view showing the positional relationship between a bridge and two imaging devices.
Figure 5:
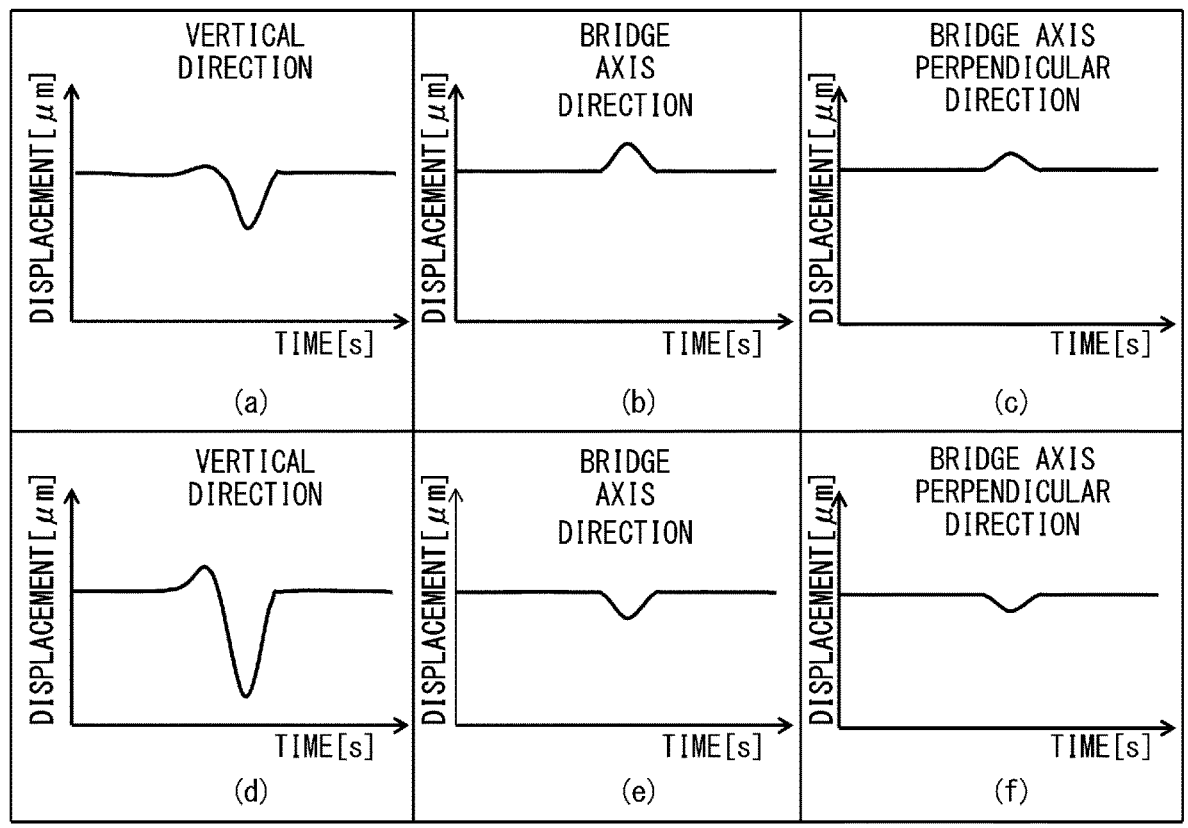
FIG. 5 is a view showing a displacement at each time calculated from time-series images.

FIG. 4 shows the positional relationship between a bridge and two imaging devices. In FIG. 4, an imaging device 200A captures images around the bearing 271, and an imaging device 200B captures images around the midpoint between the abutment 261 and the pier 262 (around the center of the span). FIG. 5 shows a displacement at each time calculated from time-series images in the case where the bearing 271 is a rubber bearing. (a) to (c) in FIG. 5 show a displacement at each time calculated from the time-series images captured in the imaging device 200A. (d) to (f) in FIG. 5 show a displacement at each time calculated from the time-series images captured by the imaging device 200B. (a) and (d) in FIG. 5 show a displacement in the Z-direction, (b) and (e) in FIG. 5 show a displacement in the X-direction, and (c) and (f) in FIG. 5 show a displacement in the Y-direction.

In the case where the bearing 271 is a rubber bearing, a rubber is deformed in the bearing 271 due to live load caused by passing of a vehicle, and it is considered that the position of an upper shoe with respect to a lower shoe would move in the vertical direction and the horizontal direction. A displacement in the vertical direction and a displacement in the horizontal direction in the bearing 271 can be measured using a contact sensor when the contact sensor is mounted on the bearing 271. The present inventor compared displacements in the vertical direction and the horizontal direction acquired using the contact sensor with displacements in the X-direction, the Y-direction and the Z-direction (see (a) to (c) in FIG. 5) calculated from the time-series images obtained by capturing images of the measurement target region around the bearing 271 by the imaging device 200A. As a result, the present inventor has found that there is a correlation between time variation of displacements measured by the contact sensor and time variation of displacements of the measurement target region calculated from the time-series images. This enables the measurement of the motion component of the bearing 271 from the time-series images captured by the imaging device 200A without need to directly mount a contact sensor on the bearing 271.

Figure 6:
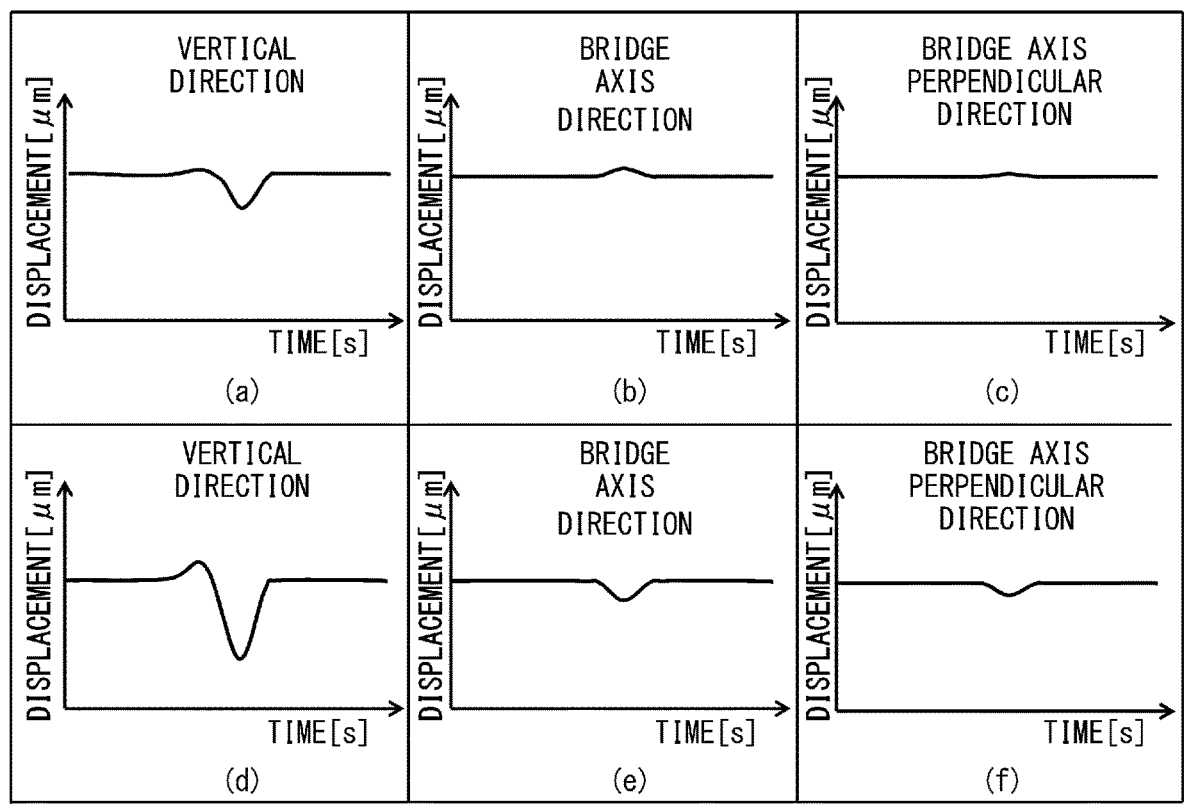
FIG. 6 is a view showing a displacement at each time calculated from time-series images.

FIG. 6 shows a displacement at each time calculated from time-series images when the bearing 271 is a bearing plate (movable). (a) to (c) in FIG. 6 show a displacement at each time calculated from the time-series images captured by the imaging device 200A. (d) to (f) in FIG. 6 show a displacement at each time calculated from the time-series images captured by the imaging device 200B. (a) and (d) in FIG. 6 show a displacement in the Z-direction, (b) and (e) in FIG. 6 show a displacement in the X-direction, and (c) and (f) in FIG. 6 show a displacement in the Y-direction.

In the case where the bearing 271 is a bearing plate, the bearing 271 rotates due to live load caused by passing of a vehicle. Further, the bearing 271 is displaced also in the bridge axis direction (X-direction) because it is movable. For a bearing plate also, the present inventor compared displacements acquired when a contact sensor is used and displacements in the X-direction, the Y-direction and the Z-direction (see (a) to (c) in FIG. 6) calculated from the time-series images captured using the imaging device 200A. As a result, the present inventor has found that there is a correlation between time variation of displacements measured by the contact sensor and time variation of displacements of the measurement target region calculated from the time-series images in the case of a bearing plate also. This enables the measurement of the motion component of the bearing 271 from the time-series images captured in the imaging device 200A without need to directly mount the contact sensor on the bearing 271.

In this example embodiment, the motion estimation unit 104 estimates the motion of a part of the bearing 271 in the bridge 250 based on the three-dimensional displacement of the measurement target region calculated in the displacement calculation unit 101. The motion estimated by the motion estimation unit 104 includes the rotation of the bridge 250 around the point of support (the position of the supporting member (bearing) 271) of the bridge 250. The motion estimation unit 104 estimates the rotation of the bridge 250 around the position of the bearing 271 by using the distance between the measurement target region and the bearing 271.

Figure 7:
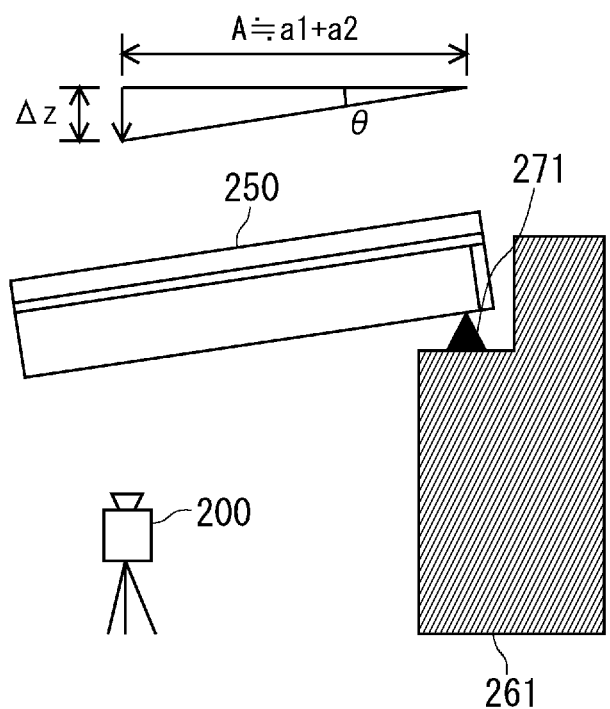
FIG. 7 is a view showing the state where a bridge is rotating.

FIG. 7 shows the state where the bridge 250 is rotating. The displacement calculation unit 101 calculates a displacement $\Delta z$ in the Z-direction of the bridge 250 at the center of the measurement target region.

The distance A from the center of the measurement target region to the bearing 271 before displacement in the bridge axis direction is substantially equal to the sum of the distance a1 (see FIG. 3) from the end of the abutment 261 to the imaging device 200 and the distance a2 from the end of the abutment 261 to the bearing 271. Since the rotation angle θ of the bridge 250 is small, sin θ≈tan θ≈θ [rad] holds. Using this approximation, the rotation angle θ can be represented by θ=$\Delta z$/A [rad]. Specifically, θ=$\Delta z$/A×180/π [degree] holds.

The motion estimation unit 104 may estimate the motion of a part supported by the supporting member in the bridge 250 depending on the type of the supporting member supporting the bridge 250. For example, a user inputs information identifying the type of the supporting member to the information processing device 100. When the supporting member is a bearing, for example, the movable direction and the rotation direction of the bearing are different depending on the type of the bearing used. The motion estimation unit 104 estimates the horizontal movement component (the component of movement in the X-Y plane), the rotation component and the like of the bridge 250 based on the input information indicating the type of the bearing and the three-dimensional displacement (three-dimensional displacement information) calculated by the displacement calculation unit 101.

To be specific, in the case where the bearing 271 is a rubber bearing, the motion estimation unit 104 calculates a shear direction movement component (vertical movement component+horizontal movement component) from the three-dimensional displacement information. Note that, in the case of a rubber bearing, a rotation component is included in actuality. However, it is difficult to separate the vertical movement component and the rotation component by the measurement of one location only. Therefore, in the case of a rubber bearing, the motion estimation unit 104 may use the three-dimensional displacement calculated by the displacement calculation unit 101 as the shear direction movement component without particularly separating the vertical movement component and the rotation component.

In the case where the bearing 271 is a pin bearing or a pivot bearing, the motion estimation unit 104 calculates a rotation component from the three-dimensional displacement information. In the pin bearing and the pivot bearing, a displacement in the horizontal direction does not occur structurally. Thus, the motion estimation unit 104 calculates the rotation angle of the bridge 250 around the position of the bearing 271 based on a displacement $\Delta z$ in the Z-direction and the distance A (see FIG. 7) in the horizontal direction from the imaging device 200 to the bearing 271.

In the case where the bearing 271 is a roller bearing, a pin roller bearing, a line bearing (movable) or a bearing plate (movable), the motion estimation unit 104 calculates a movement component in the horizontal direction and a rotation component from the three-dimensional displacement information. In this case, the motion estimation unit 104 uses displacements $\Delta x$ and $\Delta y$ in the X-direction and the Y-direction as displacements in the horizontal direction of the bridge 250. Further, the motion estimation unit 104 calculates the rotation angle of the bridge 250 around the position of the bearing 271 based on the displacement $\Delta z$ in the Z-direction and the distance A in the horizontal direction from the imaging device 200 to the bearing 271.

A bearing has a different function (movable/constrained, rotatable/non-rotatable) depending on its structure. The motion estimation unit 104 estimates the motion of the bridge 250 at the position of the bearing 271 from the three-dimensional displacement information for each structure of the bearing as described above, for example. This allows determining whether a load support function, a movement function, a rotation function and the like are working normally or not based on the motion estimated by the motion estimation unit 104 for bearings having different structures.

The motion estimation unit 104 may estimate the motion of the end of the bridge 250 connected to the abutment 261 or 263 through the expansion joint 281 or 282, instead of or in addition to estimating the motion of the bridge 250 at the position of the bearing 271 described above. In this case, the motion estimation unit 104 may estimate the motion in the direction corresponding to the type of the expansion joint.

The amount, direction, and frequency of displacement occurring in the bearing, the expansion joint, and the fixed end of a bridge are different depending on their type and oscillation direction. Further, a failure mode is also different. Measuring them quantitatively enables determination about the degree of deterioration of the function.

The bearing has a function of attenuating and transmitting a component of an external force applied to a superstructure due to passing of a vehicle, wind and the like to a bridge pier, and the superstructure is protected by this function. The bearing also has a function of attenuating and transmitting an oscillation from the ground such as an earthquake to a superstructure. The movable direction of the bearing is defined according to its type. When the motion estimated by the motion estimation unit 104 is a motion within an acceptable range along the movable direction, it is determined that the bearing is normal. On the other hand, when the motion estimated by the motion estimation unit 104 is a motion outside an acceptable range in the movable direction or a motion in a direction different from the movable direction or when the motion in the rotation direction is equal to or greater than a threshold, it is determined that the bearing is abnormal. When a motion is not measured at all in the motion estimation unit 104 in spite of the fact that an external force is being applied, there is a concern of adherence or the like, and it is determined that the bearing is losing its function. If the bearing has a fault, it fails to let out a force, which causes distortion to occur in other members and the like and leads to abnormal deformation and breakdown.

The expansion joint, which is a connecting member placed at a connection part to another structure, has a function that enables a vehicle passing on the seam of a bridge to smoothly pass through between the bridge and the ground and between the bridge and another bridge. The expansion joint also has a function of easing the impact on the girder end and thereby reducing damage on the bridge. The movable direction of the expansion joint is defined according to its type. When the motion along the movable direction estimated by the motion estimation unit 104 is within an acceptable range or has an oscillation within an acceptable range, it is determined that the expansion joint is normal. On the other hand, when the motion estimated by the motion estimation unit 104 is a large motion or oscillation outside an acceptable range in the movable direction, it is determined that the function of attenuating the oscillation of the expansion joint is degraded. Further, when the motion is in a direction different from the movable direction or the motion in the rotation direction is equal to or greater than a threshold, it is determined that the expansion joint is abnormal. When a motion is not measured at all in the motion estimation unit 104 in spite of the fact that an external force is being applied, there is a concern of adherence or the like, and it is determined that cleaning or the like of the expansion joint is needed.

Note that the fixed end does not move. Thus, the motion estimated by the motion estimation unit 104 is significantly small. When a motion or an oscillation exceeding an acceptable level or a motion in the rotation direction are estimated by the motion estimation unit 104, it is determined that the fixed end is not functioning normally.

The condition determination unit 105 determines the condition of the bridge 250 based on the motion estimated by the motion estimation unit 104. Since the motion of the position of the bearing 271 in the bridge 250 depends on the function of the bearing 271, the condition determination unit 105 mainly determines the condition of the bearing 271. The condition determination unit 105 determines the condition of the bearing 271 by determining whether at least one of the symmetry, continuity and correlation of the motion estimated by the motion estimation unit 104 is within an acceptable range or not. Alternatively, the condition determination unit 105 may determine the condition of the bearing 271 based on the amplitude, phase and frequency of the motion estimated by the motion estimation unit 104.

For example, consider a graph of a displacement where the horizontal axis indicates the bridge axis direction or the bridge axis perpendicular direction and the vertical axis indicates the vertical direction. In this graph with the shape/locus of time-series variation in displacement, when the bearing is not functioning normally, a rapid change in slope or a hysteresis shape, which is not observed when the bearing is functioning normally, appears. Alternatively, remaining components are generated, and at least one of the symmetry, continuity and correlation in the graph changes compared with when the bearing is functioning normally. Thus, by determining whether they are within respective predetermined acceptable ranges or not, it can be determined whether the bearing has a normal function or not.

For example, when the motion estimated by the motion estimation unit 104 is deviated from the motion shown in the relationship diagram between a displacement of the bearing and an external force, which is stored in advance, the condition determination unit 105 may determine that the bearing is not in sound condition. In other words, the condition determination unit 105 may determine that the bearing is degraded or anomaly is occurring in the bearing. Alternatively, the condition determination unit 105 may determine that the bearing is not in sound condition when it is observed that displacements in the bridge axis direction and the vertical direction are restricted in the motion estimated by the motion estimation unit. The condition determination unit 105 may determine an initial impact, attenuation of an impact and the like by using oscillation components (amplitude, phase, and frequency) or their time variation. Those indices can be also used for the determination as to whether the bearing has a normal function or not. The condition determination unit 105 may determine the condition of the expansion joint by determining the level of an oscillation amplitude (the level of an impact), a correlation value with a displacement in the vertical direction, and whether the movable range (displacements in the vertical direction and the horizontal direction) is constrained or not.

Figure 8:
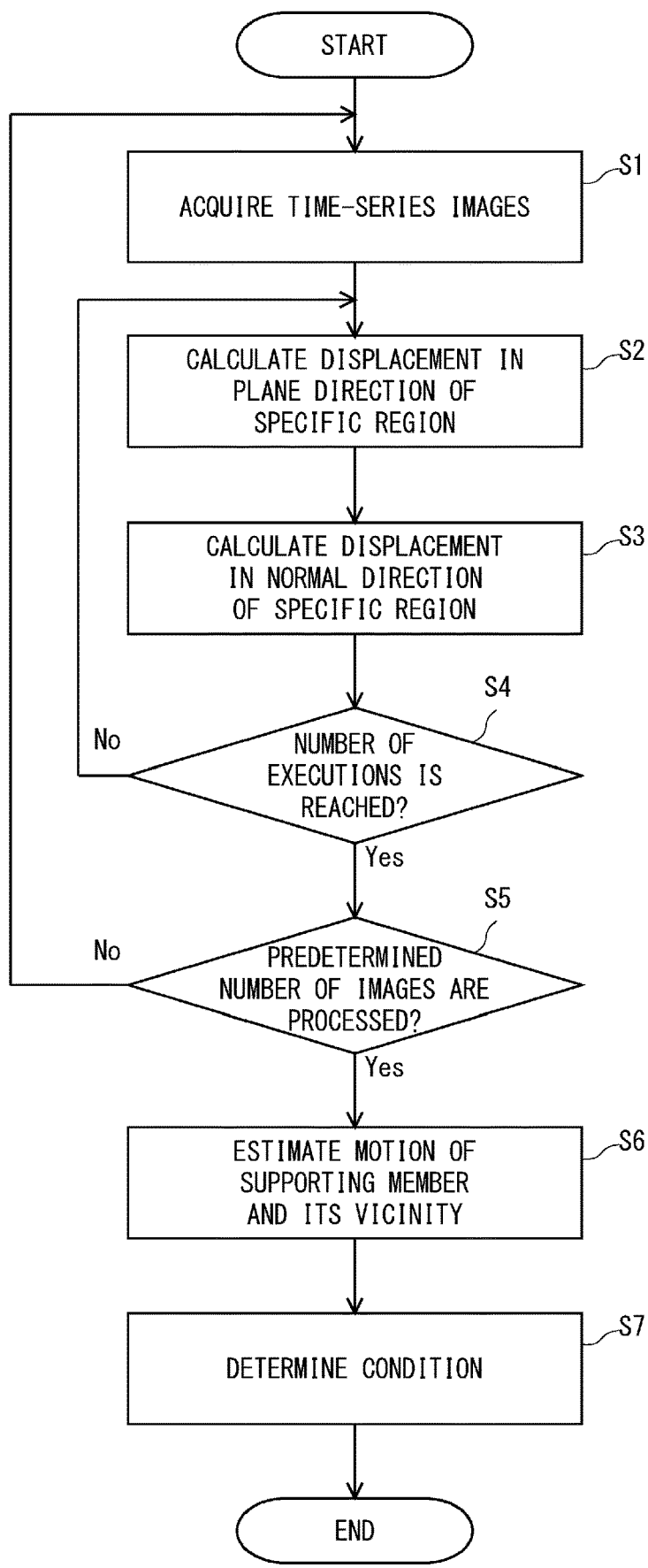
FIG. 8 is a flowchart showing an operation procedure in an information processing device.

An operation procedure is described hereinafter. FIG. 8 shows an operation procedure in the information processing device 100. The displacement calculation unit 101 acquires time-series images of a measurement target region of the structure 250 from the imaging device 200 (Step S1). Using image data of the time-series images, the in-plane displacement calculation unit 102 of the displacement calculation unit 101 calculates displacements $d1x$ and $d1y$ in the plane direction of a specific region included in the measurement target region in the image data (Step S2). The in-plane displacement calculation unit 102 sends the image data of the time-series images and the calculated displacements in the plane direction to the normal direction displacement calculation unit 103.

The normal direction displacement calculation unit 103 calculates a displacement $d1z$ in the normal direction of the specific region based on the image data of the time-series images and the displacements in the plane direction calculated in Step S2 (Step S3). The normal direction displacement calculation unit 103 determines whether the number of executions of Step S2 has reached a predetermined number of executions (Step S4). The predetermined number of executions is set as appropriate according to a result of an experiment or the like conducted in advance. The predetermined number of executions may be "1".

When the normal direction displacement calculation unit 103 determines that the number of executions has not reached the predetermined number of executions in Step S4, it directs the in-plane displacement calculation unit 102 to execute Step S2. At this time, the normal direction displacement calculation unit 103 notifies the in-plane displacement calculation unit 102 of the displacement $d1z$ in the normal direction calculated in Step S3. The in-plane displacement calculation unit 102 newly calculates displacements $d2x$ and $d2y$ in the plane direction in Step S2. After that, the normal direction displacement calculation unit 103 calculates a displacement $d2z$ in the normal direction at Step S3 by using the newly calculated displacements in the plane direction.

Step S2 and Step S3 are repeated until it is determined in Step S4 that the number of executions has reached the predetermined number of executions. When the predetermined number of executions is 2 or more, Step S3 may be omitted in the last repetition.

When the normal direction displacement calculation unit 103 determines that the number of executions has reached the predetermined number of executions in Step S4, it determines whether the number of processing images for which the calculation of a displacement is done is smaller than a predetermined number m or not (Step S4). Stated differently, the normal direction displacement calculation unit 103 determines whether the predetermined number m of processing images have been processed or not. The value of the predetermined number m is set as appropriate according to a result of an experiment or the like conducted in advance. When it is determined in Step S4 that the predetermined number m of processing images have not been processed, the process returns to Step S1, and processing from Step S1 to Step S5 is performed on newly acquired time-series images.

When it is determined in Step S5 that the predetermined number of processing images have been processed, the displacement calculation unit 101 converts the displacements in the plane direction calculated in Step S2 and the displacement in the normal direction calculated in Step S3 into the amount of movement in the three-axial directions (three-dimensional displacement information) of the bridge 250. The displacement calculation unit 101 outputs the three-dimensional displacement to the motion estimation unit 104. The motion estimation unit 104 estimates the motion of the position of the bearing 271 in the bridge 250 based on the three-dimensional displacement information (Step S6). The condition determination unit 105 determines the condition of the bearing 271 based on the motion estimated in Step S6 (Step S7).

In this example embodiment, the information processing device 100 acquires time-series images of a main girder around a girder end from the imaging device 200 placed under the bridge 250, in the substructure of the bridge 250 or the like. The information processing device 100 performs image processing on the time-series images and thereby estimates the motion such as the three-dimensional displacement and the rotation of the bridge 250 at the position of the bearing 271 or the like placed at the girder end. In this example embodiment, the motion of the bridge 250 at the position of the bearing 271 or the like is estimated from the images, and therefore there is no need to mount a marker or the like on the bridge 250 in advance. Thus, a worker does not need to come close to the bridge 250 by using an aerial work vehicle or the like, and this allows the degree of deterioration in the function of a member such as a bearing to be evaluated in a quantitative manner at realistic cost.

The information processing device 100 determines conditions such as degradation and soundness of the bearing 271 or the like by using the motion estimated as described above. For example, when the bridge 250 receives an enormous external force such as an earthquake, a part susceptible to damage is a bearing and its vicinity. In this example embodiment, by determining the degradation and soundness of a bearing part, the soundness of the whole bridge is also determined. For example, in the event of a large earthquake, the soundness of each bridge is determined by estimating the motion at the position of a bearing part in a plurality of bridges, and further priorities of urgency may be set by determining a bridge that is most severely damaged.

In this example embodiment, the motion estimation unit 104 estimates the motion at the position of the supporting member in the bridge 250 from the three-dimensional displacement information according to the supporting member in use. The motion of the supporting member is thereby estimated based on the three-dimensional displacement information measured using the same measurement method, regardless of the structure of the supporting member (mainly, the bearing). In the case of using a contact sensor, if the structure of the supporting member varies, the items of the motion of the supporting member to be measured vary accordingly. For example, it is necessary to use a sensor for detecting a rotation component when the supporting member of a certain structure is used, and it is necessary to use a sensor for detecting a displacement in the horizontal direction when the supporting member of another structure is used. In this example embodiment, even when the structure of the supporting member varies, the motion of the supporting member can be estimated by calculating the three-dimensional displacement of the same measurement position (measurement target region) from the time-series images with use of the same measurement device, which makes measurement work easier and thereby improves the efficiency.

Further, in this example embodiment, the motion estimation unit 104 estimates the rotation of the bridge 250 around the position of the bearing 271. By estimating the rotation around the bearing 271, one of the important functions of the bearing is directly evaluated. The measurement of a rotation component generally requires a special sensor such as a tilt sensor. However, the tilt sensor is sensitive to oscillations and the like, and it is unable to measure a displacement component such as parallel displacement. Further, the tilt sensor is not suitable for an application that measures a minute rotation, and it is difficult to measure the rotation centering on the bearing when a load is imposed by using the tilt sensor. This example embodiment enables the estimation of the rotation about the bearing by using images, and has an advantage that there is no need to use the tilt sensor.

Note that, in this example embodiment, the information processing device 100 is not necessarily configured in one device. For example, the displacement calculation unit 101, the motion estimation unit 104, and the condition determination unit 105 may be configured as separate devices. In the information processing device 100, the condition determination unit 105 is not essential. The motion estimated by the motion estimation unit 104 may be displayed as a graph or the like on a display device of the information processing device 100 or the like, and a person who views this graph may determine the condition of the bridge 250.

Further, although an example where the imaging device 200 captures images of a part near the end of the bridge 250 on the abutment 261 side is shown in FIG. 3, this example embodiment is not limited thereto. For example, the imaging device 200 may be placed near the pier 262, and the imaging device 200 may capture images of a part near the center of the bridge 250. In this case, the motion estimation unit 104 may estimate the motion in the rotation direction around a bearing 272 on the pier 262 in the bridge 250. By changing the position of the bridge 250 at which images are to be captured using the imaging device 200, the condition of the bearing at any position is able to be determined using the captured time-series images.

Figure 9:
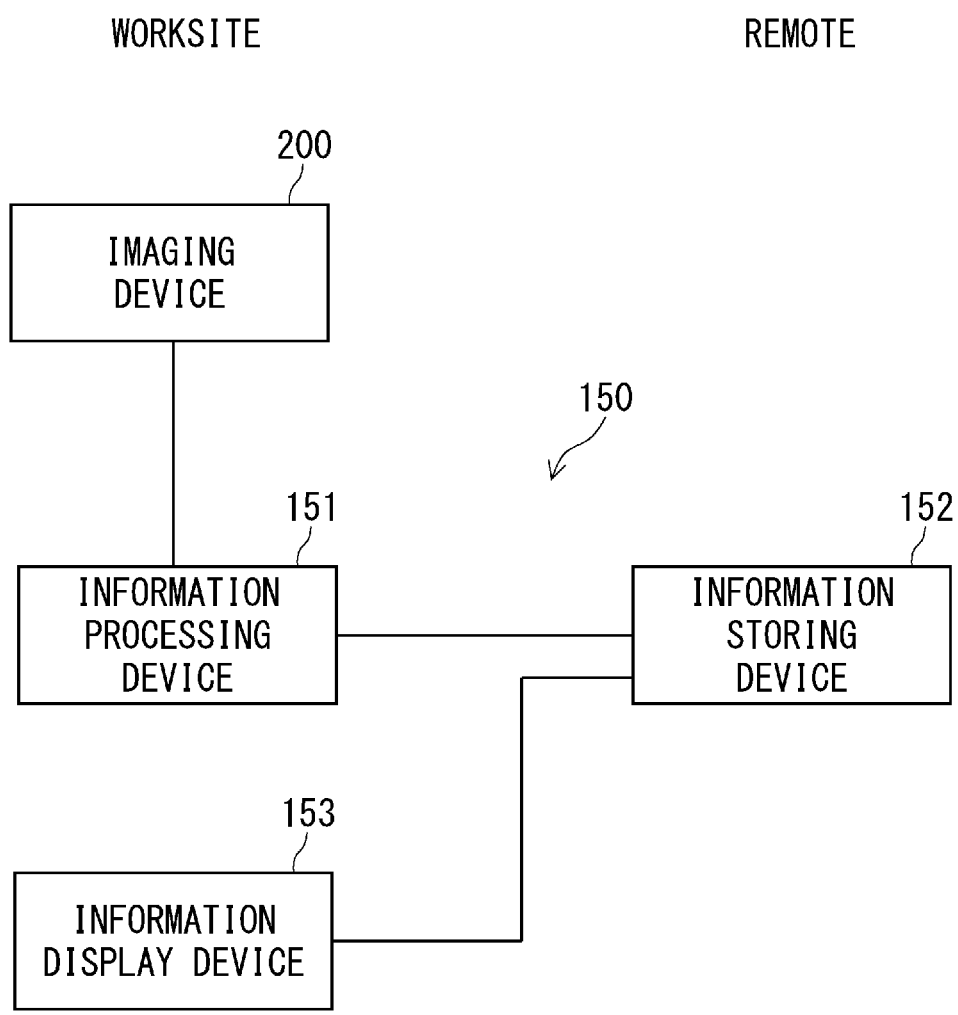
FIG. 9 is a block diagram showing an information processing system according to a second example embodiment of the present disclosure.

A second example embodiment of the present disclosure is described hereinbelow. FIG. 9 shows an information processing system according to a second example embodiment of the present disclosure. An information processing system 150 includes an information processing device 151, an information storing device 152, and an information display device 153. The configuration of the information processing device 151 may be the same as that of the information processing device 100 according to the first example embodiment shown in FIG. 2. For the information processing device 151 and the information display device 153, a portable device such as a notebook PC (Personal Computer) or a tablet computer device may be used, for example.

In this example embodiment, the imaging device 200, the information processing device 151, and the information display device 153 are placed in a worksite where the bridge 250 (see FIG. 3) or the like is located, for example. The information storing device 152 is configured as a remote server or a cloud server that is distant from the worksite. The information processing device 151 and the information storing device 152 are connected through a network such as the Internet. Further, the information storing device 152 and the information display device 153 are connected through a network such as the Internet. The information processing device 151 and the information display device 153 are not necessarily physically separated, and the same device may function as the information processing device 151 and the information display device 153.

The information processing device 151 acquires, from the imaging device 200, time-series images of a measurement target region of the structure 250 supported by the abutment 261 and the like. The information processing device 151 calculates a three-dimensional displacement of the measurement target region from the time-series images, and estimates the motion of a part of the bearing 271 in the bridge 250 based on the calculated three-dimensional displacement of the measurement target region. The information processing device 151 may further determine the condition of the bridge 250 (bearing 271) based on the estimated motion of the bridge 250.

The information processing device 151 transmits the estimated motion of the bridge 250 and a result of the condition determination to the information storing device 152 through a network. The information storing device 152 is configured as a database server, for example, and stores the information received from the information processing device 151. The information processing device 151 may transmit the time-series images acquired from the imaging device 200 to the information storing device 152. In this case, the information storing device 152 may further store the time-series images received from the information processing device 151.

The information display device 153 requests, to the information storing device 152, the motion of the bridge 250 estimated by the information processing device 151 and a result of the condition determination of the bridge 250. The information display device 153 can request the motion of the bridge 250 and a result of the condition determination of the bridge 250 at any given point of time. In response to this request, the information storing device 152 transmits the estimated motion of the bridge 250 and a result of the condition determination of the bridge 250 to the information display device 153. The information display device 153 displays the information received from the information storing device 152 on its display device. A user at the worksite can check the result of the condition determination of the bridge 250 as to whether there is any abnormality or irregularity in the motion of the bridge 250 by using the information display device 153.

In this example embodiment, the motion of the bridge 250 estimated by the information processing device 151 and a result of the condition determination of the bridge 250 are stored in the information storing device 152. The information display device 153 can receive the motion of the bridge 250 and the like at any given point of time in the past from the information storing device 152 and display it. In this manner, a user can compare the current motion of the bridge 250 and the like with the motion of the bridge 250 and the like at any given point of time in the past.

Figure 10:
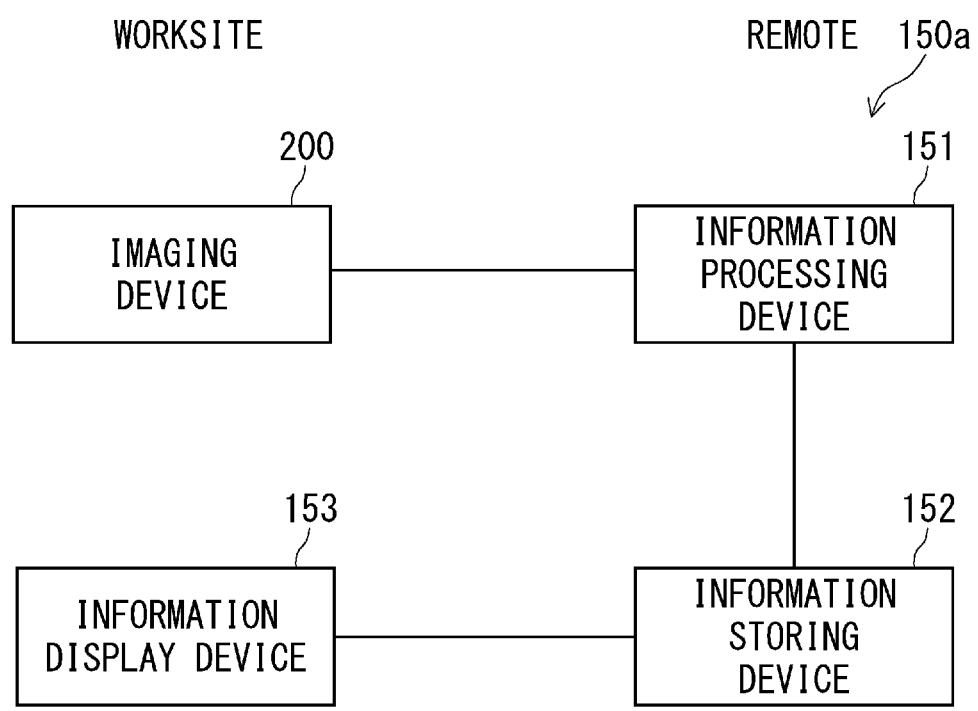
FIG. 10 is a block diagram showing an information processing system according to a modified example.

FIG. 10 shows an information processing system according to a modified example. In an information processing system 150a according to this modified example, the information processing device 151 is connected to the imaging device 200 through a network. In this modified example, the information processing device 151 is configured as a remote server or a cloud server, for example. The imaging device 200 transmits image data of time-series images to the information processing device 151 through a network. The information processing device 151 acquires the time-series images from the remote imaging device 200. In this manner, even when the information processing device 151 is located remotely, the same effects as those of the information processing system 150 according to the second example embodiment are obtained. In this modified example, the information processing device 151 and the information storing device 152 are not necessarily physically separated, and the same device may function as the information processing device 151 and the information storing device 152.

Figure 11:
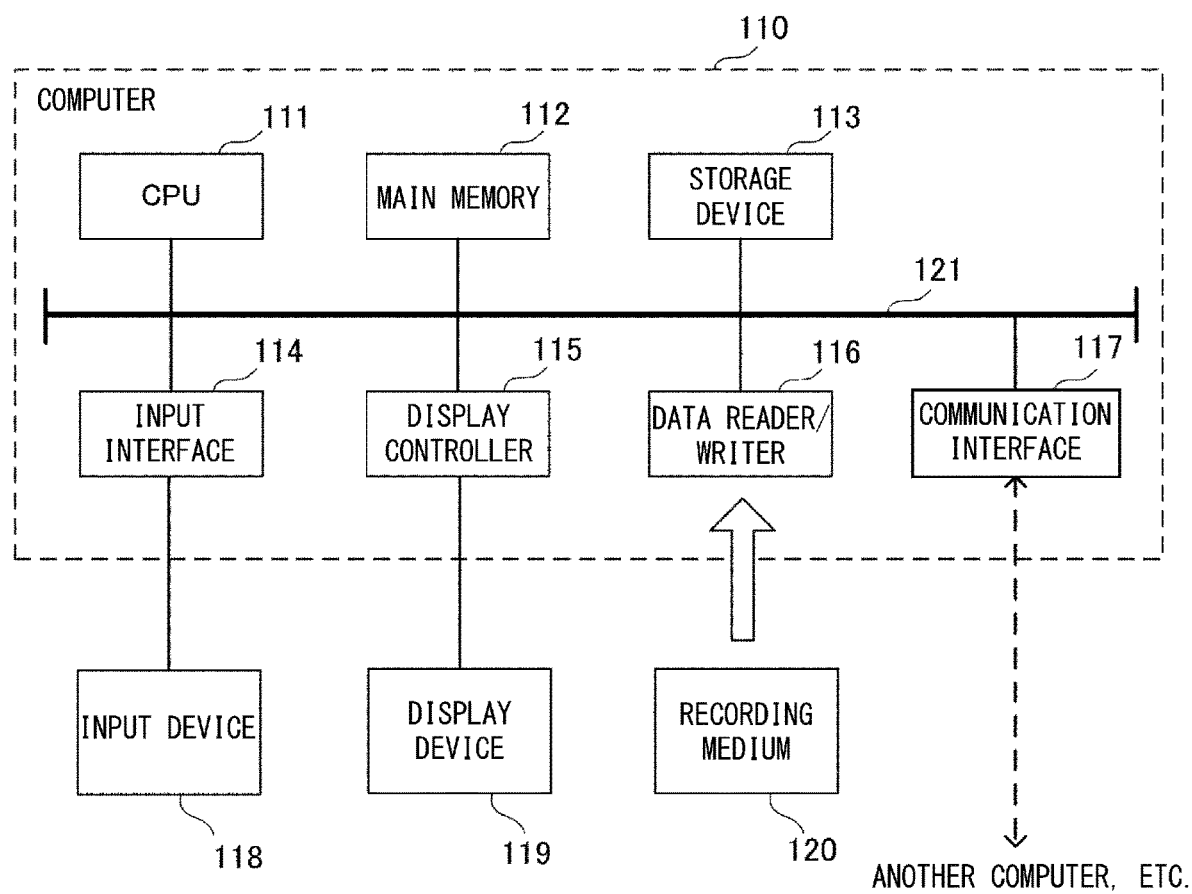
FIG. 11 is a block diagram showing a computer device.

A computer device capable of functioning as the information processing device 100 and the like is described hereinafter. FIG. 11 shows a computer device capable of functioning as the information processing device 100 by executing a program. A computer device 110 includes a CPU (Central Processing Unit) 111, a main memory 112, a storage device 113, an input interface 114, a display controller 115, a data reader/writer 116, and a communication interface 117. In the computer device 110, those elements are connected to each other for data communication through a bus 121.

The CPU 111 performs various computations by loading a program (codes) stored in the storage device 113 in the main memory 112 and executing them in a predetermined order. The main memory 112 is typically a volatile storage device such as a DRAM (Dynamic Random Access Memory). A program causing the computer device 110 to function as the information processing device 100 is provided in the state of being stored in a computer-readable recording medium 120. The program may be provided through a network such as the Internet that is connected via the communication interface 117.

The above-described program can be stored using any type of non-transitory computer readable media and provided to a computer. The non-transitory computer readable media include any type of tangible storage media. Examples of non-transitory computer readable media include magnetic storage media such as flexible disks, magnetic tapes or hard disks, optical magnetic storage media such as magneto-optical disks, optical disc media such as CD (Compact Disc) or DVD (Digital Versatile Disk), and semiconductor memories such as mask ROM, PROM (Programmable ROM), EPROM (Erasable PROM), flash ROM or RAM (Random Access Memory). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers, or a wireless communication line.

The storage device 113 is configured as a disk device such as a hard disk drive, or a semiconductor storage device such as a flash memory, for example. The input interface 114 relays data transmission between the CPU 111 and an input device 118 such as a keyboard and a mouse. The display controller 115 is connected to a display device 119 and controls display on the display device 119.

The data reader/writer 116 relays data transmission between the CPU 111 and the recording medium 120 and executes reading of a program from the recording medium 120 and writing of processing results in the computer device 110 to the recording medium 120. The communication interface 117 relays data transmission between the CPU 111 and another computer.

While the present disclosure has been described with reference to example embodiments thereof, the present disclosure is not limited to these example embodiments. Various changes that can be understood by those skilled in the art can be made to the configurations and the details of the present disclosure within the scope of the present disclosure.

For example, the whole or part of the example embodiments disclosed above can be described as, but not limited to, the following supplementary notes.

[Supplementary Note 1]

An information processing device comprising:

a displacement calculation means for calculating a three-dimensional displacement of a measurement target region of a structure supported by a supporting member from time-series images obtained by capturing images of the measurement target region; and a motion estimation means for estimating a motion of the supporting member in the structure based on the three-dimensional displacement of the measurement target region.

[Supplementary Note 2]

The information processing device according to Supplementary Note 1, wherein the motion estimated by the motion estimation means includes a rotation of the structure around the supporting member.

[Supplementary Note 3]

The information processing device according to Supplementary Note 2, wherein the displacement calculation means calculates a displacement in a vertical direction of the structure and displacements in two directions orthogonal to each other in a plane perpendicular to the vertical direction, and the motion estimation means estimates a rotation of the structure around a point of support by using a distance between the measurement target region and the point of support.

[Supplementary Note 4]

The information processing device according to any one of Supplementary Notes 1 to 3, wherein the motion estimation means estimates a motion of a part supported by the supporting member in the structure depending on a type of the supporting member.

[Supplementary Note 5]

The information processing device according to Supplementary Note 1, wherein the structure includes a connecting member placed at a connection part to another structure, and the motion estimation means estimates a motion of an end part connected to the other structure through the connecting member in the structure.

[Supplementary Note 6]

The information processing device according to any one of Supplementary Notes 1 to 5, further comprising:

a condition determination means for determining a condition of one or both of the supporting member and the connecting member of the structure based on the motion estimated by the motion estimation means.

[Supplementary Note 7]

The information processing device according to any one of Supplementary Notes 1 to 5, further comprising:

a condition determination means for determining a condition of the structure based on the motion estimated by the motion estimation means.

[Supplementary Note 8]

The information processing device according to Supplementary Note 7, wherein the condition determination means determines the condition of the structure by determining whether at least one of symmetry, continuity and correlation of the motion estimated by the motion estimation means is within an acceptable range.

[Supplementary Note 9]

The information processing device according to Supplementary Note 7, wherein the condition determination means determines the condition of the structure based on an amplitude, a phase and a frequency of the motion estimated by the motion estimation means.

[Supplementary Note 10]

The information processing device according to any one of Supplementary Notes 1 to 9, wherein the displacement calculation means calculates a three-dimensional displacement of the measurement target region from the time-series images by using shooting information.

[Supplementary Note 11]

The information processing device according to Supplementary Note 10, wherein the shooting information includes a shooting distance, a shooting angle, and a size per pixel on a subject.

[Supplementary Note 12]

The information processing device according to any one of Supplementary Notes 1 to 11, wherein the structure includes a main girder of a bridge.

[Supplementary Note 13]

An information processing system comprising:

an information processing device configured to calculate a three-dimensional displacement of a measurement target region of a structure supported by a supporting member from time-series images obtained by capturing images of the measurement target region, and estimate a motion of the supporting member in the structure based on the calculated three-dimensional displacement of the measurement target region;

an information storing device configured to acquire the estimated motion of the structure from the information processing device and store the motion; and an information display device configured to acquire the estimated motion of the structure from the information storing device and display the motion.

[Supplementary Note 14]

The information processing system according to Supplementary Note 13, wherein the information processing device further determines a condition of the structure based on the estimated motion of the structure, the information storing device further acquires a determination result about the condition of the structure from the information processing device and stores the determination result, and the information display device further acquires the determination result about the condition of the structure from the information storing device and displays the determination result.

[Supplementary Note 15]

The information processing system according to Supplementary Note 13 or 14, wherein the information processing device acquires the time-series images through a network from an imaging device configured to capture images of a measurement target region.

[Supplementary Note 16]

The information processing system according to any one of Supplementary Notes 13 to 15, wherein the information processing device and the information storing device are connected to each other through a network.

[Supplementary Note 17]

The information processing system according to any one of Supplementary Notes 13 to 16, wherein the information storing device and the information display device are connected to each other through a network.

[Supplementary Note 18]

An information processing method comprising:

calculating a three-dimensional displacement of a measurement target region of a structure supported by a supporting member from time-series images obtained by capturing images of the measurement target region; and estimating a motion of the supporting member in the structure based on the three-dimensional displacement of the measurement target region.

[Supplementary Note 19]

The information processing method according to Supplementary Note 18, further comprising:

determining a condition of the structure based on the estimated motion.

[Supplementary Note 20]

A computer-readable medium storing a program causing a computer to execute a process of:

calculating a three-dimensional displacement of a measurement target region of a structure supported by a supporting member from time-series images obtained by capturing images of the measurement target region; and estimating a motion of the supporting member in the structure based on the three-dimensional displacement of the measurement target region.

This application is based upon and claims the benefit of priority from Japanese patent application No. 2018-141234 filed on Jul. 27, 2018, the disclosure of which is incorporated herein in its entirety by reference.

REFERENCE SIGNS LIST

10 INFORMATION PROCESSING DEVICE
11 DISPLACEMENT CALCULATION MEANS
12 MOTION ESTIMATION MEANS
100 INFORMATION PROCESSING DEVICE
101 DISPLACEMENT CALCULATION UNIT
102 IN-PLANE DISPLACEMENT CALCULATION UNIT
103 NORMAL DIRECTION DISPLACEMENT CALCULATION UNIT
104 MOTION ESTIMATION UNIT
105 CONDITION DETERMINATION UNIT
150 INFORMATION PROCESSING SYSTEM
151 INFORMATION PROCESSING DEVICE
152 INFORMATION STORING DEVICE
153 INFORMATION DISPLAY DEVICE
200 IMAGING DEVICE
250 STRUCTURE (BRIDGE)
261 to 263 SUBSTRUCTURE (ABUTMENT OR PIER)
271 to 273 SUPPORTING MEMBER (BEARING)
281, 282 JOINT (EXPANSION JOINT)

What is claimed is:

1. An information processing device comprising:
a memory storing instructions; and
a processor configured to execute the instructions to:
calculate a three-dimensional displacement of a measurement target region of a structure supported by a supporting member from time-series images obtained by capturing images of the measurement target region;
estimate a motion of the supporting member for the structure based on the three-dimensional displacement of the measurement target region; and
determine a condition of the supporting member based on the estimated motion of the supporting member.

2. The information processing device according to claim 1, wherein the estimated motion of the supporting member includes a rotation of the structure around the supporting member.

3. The information processing device according to claim 2, wherein
the processor is further configured to execute the instructions to:
calculate a displacement in a vertical direction of the structure and displacements in two directions orthogonal to each other in a plane perpendicular to the vertical direction, and
estimate a rotation of the structure around a point of support by using a distance between the measurement target region and the point of support.

4. The information processing device according to claim 1, wherein the processor is configured to execute the instructions to estimate a motion of a part supported by the supporting member in the structure further based on a type of the supporting member.

5. The information processing device according to claim 1, wherein
the structure includes a connecting member placed at a connection part to another structure, and
the processor is further configured to execute the instructions to estimate a motion of an end part connected to the other structure through the connecting member in the structure.

6. The information processing device according to claim 1, wherein the processor is further configured to execute the instructions to calculate the three-dimensional displacement of the measurement target region from the time-series images by using shooting information.

7. The information processing device according to claim 6, wherein the shooting information includes a shooting distance, a shooting angle, and a size per pixel on a subject.

8. The information processing device according to claim 1, wherein the structure includes a main girder of a bridge.

9. An information processing system comprising:
an information processing device comprising a memory storing instructions and a processor configured to execute the instructions to:
calculate a three-dimensional displacement of a measurement target region of a structure supported by a supporting member from time-series images obtained by capturing images of the measurement target region,
estimate a motion of the supporting member for the structure based on the calculated three-dimensional displacement of the measurement target region, and
determine a condition of the supporting member based on the estimated motion of the supporting member;
an information storage configured to store the estimated motion of the structure acquired from the information processing device; and
an information display configured to display the estimated motion of the structure acquired from the information storage.

10. The information processing system according to claim 9, wherein the information processing device acquires the time-series images through a network from an imaging device configured to capture the images of the measurement target region.

11. The information processing system according to claim 9, wherein the information processing device and the information storage are connected each other through a network.

12. The information processing system according to claim 9, wherein the information storage and the information display are connected to each other through a network.

13. An information processing method comprising:
calculating a three-dimensional displacement of a measurement target region of a structure supported by a supporting member from time-series images obtained by capturing images of the measurement target region;
estimating a motion of the supporting member for the structure based on the three-dimensional displacement of the measurement target region; and
determining a condition of the supporting member based on the estimated motion of the supporting member.

* * * * *